United States Patent
Gerber et al.

(10) Patent No.: US 12,228,183 B2
(45) Date of Patent: Feb. 18, 2025

(54) NESTED BRAKE CLIP

(71) Applicant: ZF Active Safety US Inc., Livonia, MI (US)

(72) Inventors: Kraig Gerber, Plymouth Township, MI (US); Jason Younglove, Monroe, MI (US)

(73) Assignee: ZF ACTIVE SAFETY US INC., Livonia, MI (US)

(*) Notice: Subject to any disclaimer, the term of this patent is extended or adjusted under 35 U.S.C. 154(b) by 199 days.

(21) Appl. No.: 17/402,988

(22) Filed: Aug. 16, 2021

(65) Prior Publication Data
US 2023/0048529 A1    Feb. 16, 2023

(51) Int. Cl.
*F16D 65/097* (2006.01)
*F16D 127/02* (2012.01)

(52) U.S. Cl.
CPC ...... *F16D 65/0978* (2013.01); *F16D 2127/02* (2013.01)

(58) Field of Classification Search
CPC ............. F16D 65/0977; F16D 65/0978; F16D 65/0979; F16D 2055/0041; F16D 65/0975; F16D 65/0006; F16D 65/097; F16D 65/0976; F16D 55/226; F16D 2065/1396; F16D 2065/1348; F16D 2055/0029; F16D 2125/58; F16D 55/02; F16D 65/122; B62L 1/00
See application file for complete search history.

(56) References Cited

U.S. PATENT DOCUMENTS 5,069,313 A * 12/1991 Kato .................. F16D 65/0975
                                                      188/73.31
5,249,647 A * 10/1993 Kobayashi ............ F16D 65/092
                                                      188/73.38
(Continued)

FOREIGN PATENT DOCUMENTS

DE    602004009485 T2    8/2008
EP    2 975 286 A1    1/2016
(Continued)

OTHER PUBLICATIONS

GB 2579776 A (Year: 2020).*

(Continued)

*Primary Examiner* — Robert A. Siconolfi
*Assistant Examiner* — Mahbubur Rashid
(74) *Attorney, Agent, or Firm* — Tarolli, Sundheim, Covell & Tummino LLP

(57) ABSTRACT

A brake clip for a disc brake assembly having a brake pad received in an anchor bracket includes a shim configured to be received in the anchor bracket. The shim includes a base leg and opposing upper and lower legs extending from the base leg to define a receiving space. At least one of the upper and lower legs includes a retaining member extending in a first direction. A spring is provided in the receiving space for receiving the brake pad. The spring includes a base and a pair of projections extending from the base. At least one of the projections includes a retaining member that cooperates with the at least one retaining member on the shim to allow for a predetermined amount of relative movement between the shim and the spring in the first direction.

17 Claims, 9 Drawing Sheets

(56) References Cited

U.S. PATENT DOCUMENTS

| | | | | |
|---|---|---|---|---|
| 5,687,817 | A * | 11/1997 | Kobayashi | F16D 65/097 188/73.38 |
| 7,040,464 | B1 * | 5/2006 | Andrews | F16D 65/0977 188/73.38 |
| 8,869,950 | B2 * | 10/2014 | Maehara | F16D 65/0976 188/73.38 |
| 9,016,442 | B2 * | 4/2015 | Odaira | F16D 65/0006 188/73.38 |
| 9,267,559 | B2 * | 2/2016 | Boyle | F16D 65/0978 |
| 9,677,629 | B2 * | 6/2017 | Boyle | F16D 65/0978 |
| 10,495,165 | B2 * | 12/2019 | Mallmann | F16D 65/543 |
| 2004/0104086 | A1 * | 6/2004 | Katoh | F16D 65/0975 188/73.38 |
| 2009/0020380 | A1 * | 1/2009 | Camilo-Martinez | F16D 65/0978 188/250 G |
| 2011/0168503 | A1 * | 7/2011 | Chelaidite | F16D 65/0978 188/73.31 |
| 2013/0025981 | A1 * | 1/2013 | Maehara | F16D 65/0978 188/73.31 |
| 2015/0021127 | A1 * | 1/2015 | Miura | F16D 65/0977 188/73.38 |
| 2015/0083530 | A1 | 3/2015 | Boyle | |
| 2018/0142744 | A1 * | 5/2018 | Krause | F16D 65/0043 |
| 2019/0085921 | A1 * | 3/2019 | Reuss | F16D 55/2262 |

FOREIGN PATENT DOCUMENTS

| | | |
|---|---|---|
| FR | 3 058 194 A1 | 5/2018 |
| JP | H10-54 431 A | 2/1998 |
| KR | 10 20160141434 A | 12/2016 |

OTHER PUBLICATIONS

DE 102012211142 A1 (Year: 2013).*
JP 2010203559 A (Year: 2010).*
Search Report from Germany PTO mailing date Jul. 13, 2023. English translation not provided.

* cited by examiner

NESTED BRAKE CLIP

TECHNICAL FIELD

The present invention relates to vehicle disc brake assemblies and, in particular, relates to a brake clip for use in such a disc brake assembly.

BACKGROUND

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are actuated by hydraulic or pneumatic pressure generated when an operator of the vehicle depresses a brake pedal. The brake assemblies can also be actuated by electromechanical brakes. The structures of these drum brake assemblies and disc brake assemblies, as well as the actuators therefore, are well known in the art.

A typical disc brake assembly includes a brake rotor which is secured to a wheel of the vehicle for rotation therewith. The disc brake assembly further includes a caliper that is slidably supported on guide pins secured to an anchor bracket. The anchor bracket, in turn, is secured to a non-rotatable component of the vehicle, such as the axle flange or steering knuckle, which is connected to the vehicle frame. The caliper includes a pair of brake pads which are disposed on opposite sides of the brake rotor. The brake pads are connected to one or more hydraulically or pneumatically actuated pistons for movement between a non-braking position and a braking position. In the braking position, the brake pads are moved into frictional engagement with the opposed braking surfaces of the brake rotor. For example, when the operator of the vehicle depresses the brake pedal, the piston urges the brake pads from the non-braking position to the braking position so as to frictionally engage the opposed braking surfaces of the brake rotor and thereby slow or stop rotation of the associated wheel of the vehicle.

When the disc brake assembly is not actuated, the brake pads are normally spaced apart from the opposite sides of the rotor. Because the brake pads are not positively engaged with the rotor, the brake pads are free to move relative to other brake and vehicle components during vehicle operation. As a result, vehicle induced vibration loads are known to cause undesirable rattle or other noises between the brake pads and the other brake components. To prevent this from occurring, it is known to provide at least one brake clip between the anchor bracket and the brake pad.

SUMMARY

In one example, a brake clip for a disc brake assembly having a brake pad received in an anchor bracket includes a shim configured to be received in the anchor bracket. The shim includes a base leg and opposing upper and lower legs extending from the base leg to define a receiving space. At least one of the upper and lower legs includes a retaining member extending in a first direction. A spring is provided in the receiving space for receiving the brake pad. The spring includes a base and a pair of projections extending from the base. At least one of the projections includes a retaining member that cooperates with the at least one retaining member on the shim to allow for a predetermined amount of relative movement between the shim and the spring in the first direction.

In another example, a device for a disc brake assembly having a first and second brake pads received in first and second anchor brackets includes a first brake clip configured to be received in the first anchor bracket and having a base leg and opposing upper and lower legs extending from the base leg to define a receiving space therebetween for receiving the first brake pad. A second brake clip is configured to be received in the second anchor bracket and has a base leg and opposing upper and lower legs extending from the base leg to define a receiving space therebetween for receiving the second brake pad. A pad separator is secured to the first and second brake clips for controlling relative movement between the first and second brake clips.

Other objects and advantages and a fuller understanding of the invention will be had from the following detailed description and the accompanying drawings.

DETAILED DESCRIPTION

Figure 1:
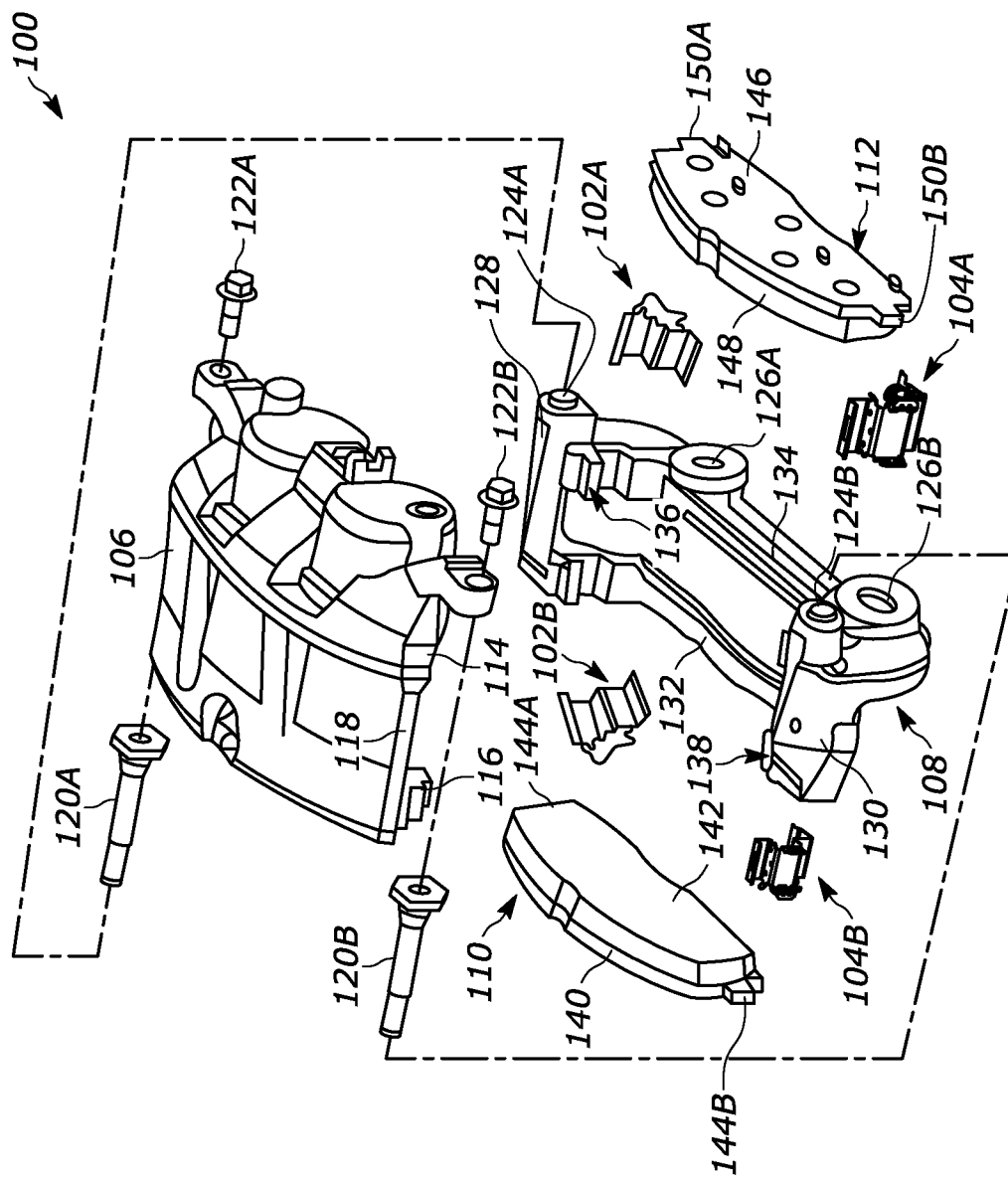
FIG. 1 is an exploded perspective view of a known disc brake assembly.

The present invention relates to vehicle disc brake assemblies and, in particular, relates to a brake clip for use in such a disc brake assembly. Referring now to FIG. 1, there is illustrated selected components of a known disc brake assembly, indicated generally at 100. The disc brake assembly 100 includes inboard and outboard first brake clips, respectively indicated generally at 102A and 102B, and inboard and outboard second brake clips, respectively indicated generally at 104A and 104B, shown in an uninstalled position.

The disc brake assembly 100 illustrated in FIG. 1 is a well-known "Collete" sliding type of disc brake assembly, such as that shown in U.S. Pat. No. 5,323,882 to Waterman, U.S. Pat. No. Re 30,255 to Rath, and U.S. Patent Publication No. 2013/0192938 to Miller, the disclosures of which are incorporated by reference herein in their entirety.

The general structure and operation of the disc brake assembly 100 is conventional in the art. Thus, only those portions of the disc brake assembly 100 which are necessary for a full understanding of this invention will be explained and illustrated in detail. Also, although this invention will be described and illustrated in connection with the particular disc brake assembly 100 disclosed herein, it will be appreciated that this invention may be used in connection with other types of disc brake assemblies. For example, the invention may be used in conjunction with other single piston, twin piston, single opposed piston and twin opposed piston disc brake assemblies, such as shown for example in U.S. Pat. No. 7,784,591 to Franz, the disclosures of which are incorporated by reference herein in their entirety.

The disc brake assembly 100 includes a generally C-shaped caliper 106, an anchor bracket 108, and outboard and inboard brake pads 110 and 112, respectively. The disc brake assembly 100 is illustrated as being adapted for use on a front left wheel of a vehicle but could likewise be implemented on a front right, rear right, and/or rear left wheel.

The caliper 106 includes an inner section 114 and an outer section 116 connected by a bridge section 118. The caliper 106 is slidably supported on the anchor bracket 108 by first and second guide pins 120A, 120B that extend into the anchor bracket 108. The caliper 106 can be secured to the first and second guide pins 120A, 120B by first and second guide pin bolts 122A, 122B. The anchor bracket 108 is, in turn, secured to a stationary component of a vehicle, such as for example an axle flange (not shown) or a steering knuckle (also not shown).

The anchor bracket 108 includes first and second spaced apart, non-threaded openings 124A, 124B and first and second spaced apart threaded openings 126A, 126B. The first and second non-threaded openings 124A, 124B are each adapted to receive one of the associated first or second guide pins 120A or 120B. The first and second threaded openings 126A, 126B are each adapted to receive a mounting bolt (not shown). The mounting bolts extend through the first and second threaded openings 126A, 126B and are received in openings provided in the stationary vehicle component (not shown), thereby securing the anchor bracket 108 to the stationary vehicle component. Alternatively, other known securing methods can be used to secure the caliper 106 to the anchor bracket 108 and/or to secure the anchor bracket 108 to the stationary vehicle component if so desired (not shown).

The anchor bracket 108 also includes a pair of axially and outwardly extending first and second arms 128, 130. The arms 128, 130 are interconnected at their outboard ends by an outer tie bar 132 and interconnected at their inboard ends by an inner tie bar 134. The first arm 128 is at the first end of the disc brake assembly 100. The second arm 130 is at the second end of the disc brake assembly 100. Alternatively, the anchor bracket 108 can be constructed to include only one of the outer tie bar 132 or inner tie bar 134 (not shown).

The first and second arms 128, 130 include respective first and second spaced apart notches or channels 136, 138. Only the first channels 136 are shown, but the second channels 138 are preferably identical to the first channels 136. To this end, the first channels 136 are provided on an inner wall of the first arm 128 and extend parallel to one another. The second channels 138 are provided on an inner wall of second arm 130 and extend parallel to one another.

The first and second channels 136, 138 slidably support the outboard brake pad 110 and the inboard brake pad 112, respectively. The brake pads 110, 112 have the inboard and outboard first brake clips 102A, 102B and the inboard and outboard second brake clips 104A, 104B, assembled therewith. Consequently, the first and second channels 136, 138 are adapted to receive the associated inboard and outboard first brake clips 102A, 102B and the associated inboard and outboard second brake clips 104A and 104B, respectively, prior to assembly of the outboard and inboard brake pads 110 and 112 to the anchor bracket 108.

The outboard brake pad 110 includes an outboard backing plate 140 and an outboard brake friction pad 142. The outboard backing plate 140 includes opposite ends having outwardly projecting first and second outboard guide rails 144A, 144B (only the second outboard guide rail 144B is shown) formed thereon. The first and second outboard guide rails 144A, 144B are configured to support the outboard brake pad 142 for sliding movement within the first and second channels 136 and 138, respectively, of the anchor bracket 108.

Similarly, the inboard brake pad 112 includes an inboard backing plate 146 and an inboard friction pad 148. The inboard backing plate 146 includes opposite ends having outwardly projecting first and second inboard guide rails 150A, 150B formed thereon. The first and second inboard guide rails 150A, 150B are configured to support the inboard brake pad 112 for sliding movement within the first and second channels 136 and 138, respectively, of the anchor bracket 108. Alternatively, the outboard brake pad 110 can be supported on a brake piston of the disc brake assembly 100 while the inboard brake pad 112 can be supported on the inner section 114 of the caliper 106 (not shown). In the illustrated embodiment, the first and second outboard guide rails 144A, 144B and the first and second inboard guide rails 150A, 150B each have a generally rectangular cross-sectional shape, although other cross-sectional shapes are contemplated.

Figure 2A:
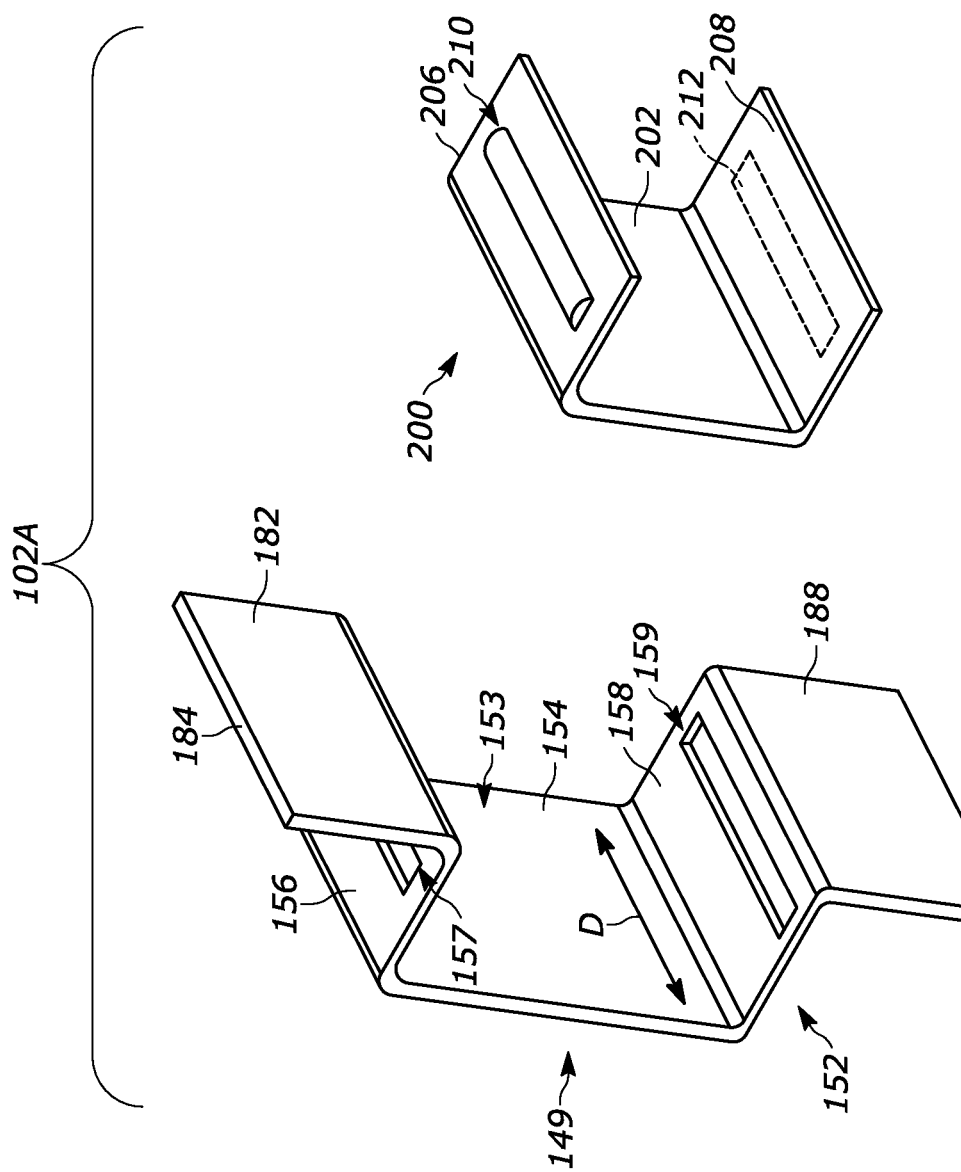
FIG. 2A is an exploded view of an example brake clip for the disc brake assembly of FIG. 1.
Figure 2B:
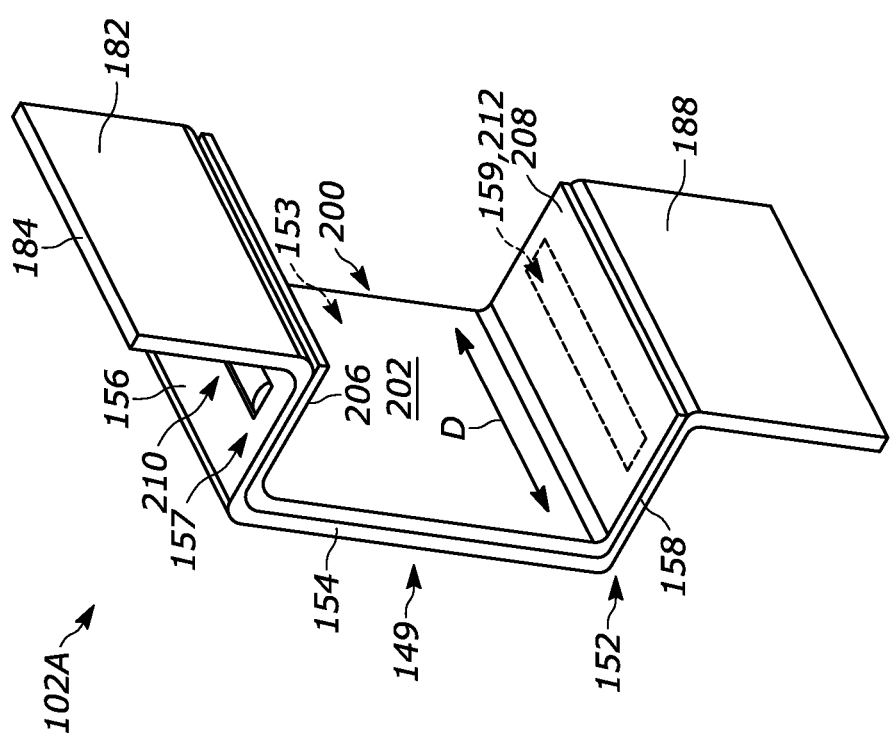
FIG. 2B is a perspective view of the brake clip of FIG. 2A in a nested condition.

Referring now to FIGS. 2A-2B, one example configuration for the inboard first brake clip 102A is shown in accordance with the present invention. As will be readily understood by one skilled in the art, although only the inboard first brake clip 102A is described and illustrated in FIGS. 2A-2B, the outboard first brake clip 102B, as well as the inboard and outboard second brake clips 104A and 104B, respectively, are similar.

In FIGS. 2A-2B, the brake clip 102A is shown in the "free" or uninstalled state. The brake clip 102A includes a resilient shim 149 and a spring 200 nested with the shim. The shim 149 includes a body section 152 having a substantially flat/planar base leg 154. A first or upper leg 156 and a second or lower leg 158 extend outwardly from opposing ends of the base leg 154. The upper leg 156 and the lower leg 158 can be flat or planar structures that extend substantially parallel with one another. The legs 156, 158 can extend perpendicular with the base leg 154, thereby forming a rectangular shape that generally corresponds with the shape of the first channel 136. Alternatively, the upper leg 156 and the lower leg 158 can have curved constructions (not shown). In any case, the legs 154, 156, 158 cooperate to define a receiving space 153.

The upper leg 156 includes at least one retaining member 157. The lower leg 158 includes at least one retaining member 159. Alternatively, either retaining member 157 or 159 can be omitted (not shown). The retaining members 157, 159 shown each consist of an opening extending entirely through the respective leg 156, 158. The openings 157, 159 have a length extending generally in the direction indicated at D, which is parallel to the lengths of the legs 156, 158. The openings 157, 159 extend over less than the entire lengths of the legs 156, 158.

A support leg 182 extends from the upper leg 156 and includes a terminal edge 184 defining an upper extent or reach of the brake clip 102A. A resilient abutment leg 188 extends downwardly in a generally perpendicular manner from the lower leg 158. The legs 182, 188 can therefore be coplanar or extend substantially parallel to one another.

The spring 200 is generally U-shaped and includes a base 202 and a pair of projections 206, 208 extending from opposite ends of the base. The projections 206, 208 can extend substantially parallel to one another. The projections 206, 208 are spaced apart to enable the spring 200 to be inserted into the receiving space 153 of the shim 149 between the upper and lower legs 156, 158. It will be appreciated that one or both of the legs 156, 158 can include a resilient leg (not shown) similar to the supper leg 182 and the abutment leg 188, respectively, provided on the shim 149.

The spring 200 is connected to the shim 149 in a manner that allows for prescribed relative movement therebetween while nesting the spring within the shim. To this end, each projection 206, 208 includes a respective retaining member 210, 212 that cooperates with a corresponding retaining member 157, 159 on the shim 149. In other words, the retaining member 210 on the projection 206 cooperates with the retaining member 157 on the upper leg 156. The retaining member 212 on the projection 208 cooperates with the retaining member 159 on the lower leg 158.

In one example, the retaining members 210, 212 are formed as ribs. Consequently, the rib 210 extends into the opening 157 in the upper leg 156. The rib 212 extends into the opening 159 in the lower leg 158. The ribs 210, 212 and openings 157, 159 can be sized and shaped so as to form a snap-in connection with one another. The inner surface of the shim 149 defining the receiving space 153 engages the outer surface of the spring 200 and forms an interface therebetween. The lengths of the ribs 210, 212 is less than the lengths of the respective openings 157, 159 and, thus, the ribs are movable within and relative to the respective openings in the direction D.

In other words, the cooperating retaining members 157, 159, 210, 212 allow the spring 200 to move in the manner D a predetermined or prescribed amount relative to the shim 149. That said, the shim 153 and the spring 200 can be configured to reduce or minimize the sliding friction between the two components. In one example, both the inner surface of the shim 149 and the outer surface of the spring 200 are coated or otherwise provided with a coating of a relative low friction material, e.g., polytetrafluoroethylene.

It will be appreciated that although the openings 157, 159 are shown in the shim 149 and the ribs 210, 212 on the spring 200 the components could be reversed, e.g., the openings extending through the projections 206, 208 on the spring and the ribs provided on the legs 156, 158 of the shim (not shown).

Figure 3A:
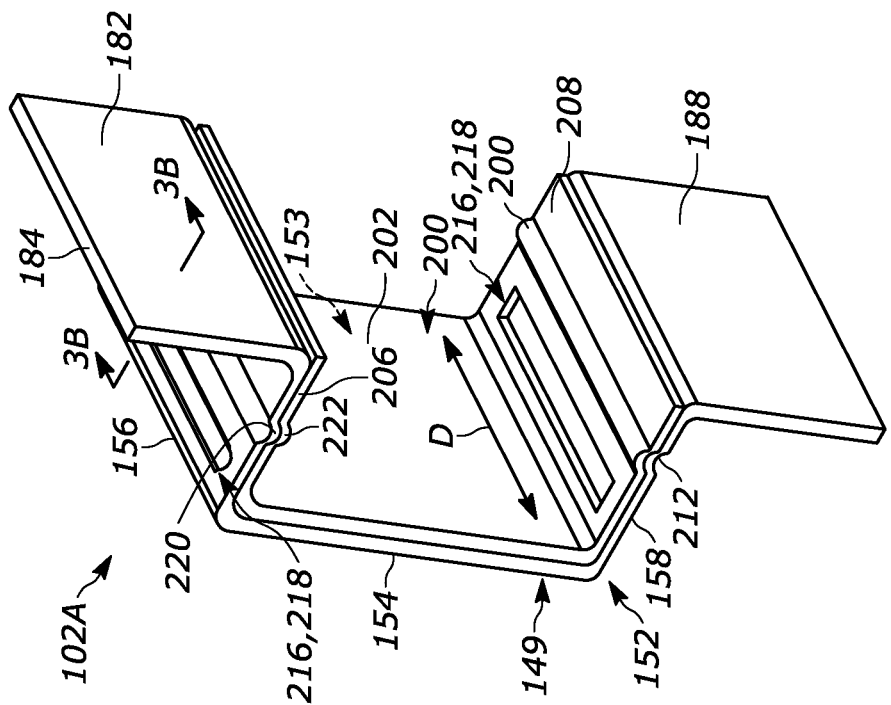
FIG. 3A is a perspective view of another example brake clip.
Figure 3B:
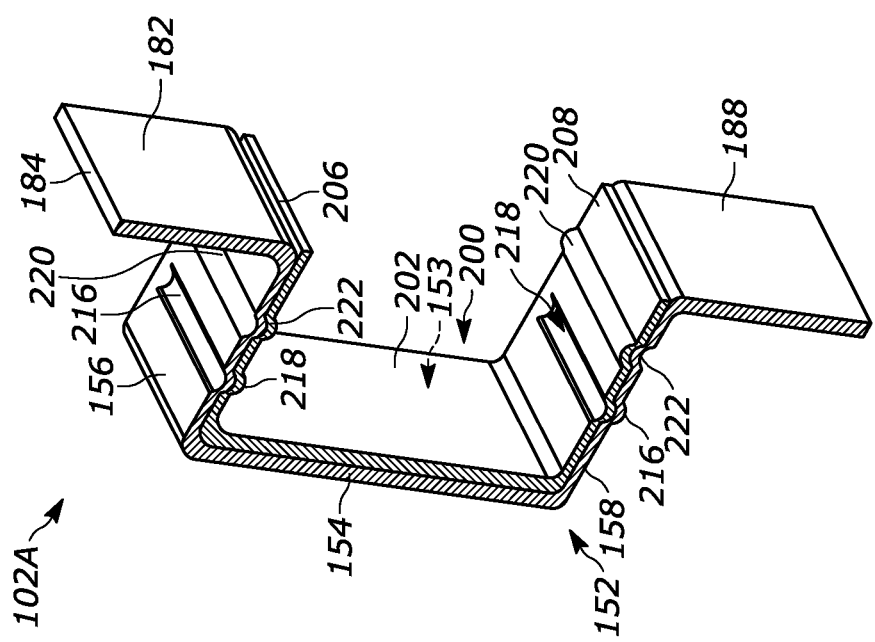
FIG. 3B is a section view taken along line 3B-3B of FIG. 3A.

In another example illustrated in FIG. 3A-3B, the brake clip 102A includes cooperating retaining members 216, 218 and cooperating alignment members 220, 222. More specifically, each of the upper leg 156 and the lower leg 158 includes a rib 216 extending towards the receiving space 153, i.e., the ribs extend towards one another. The ribs 216 extend a predetermined distance across the length of the legs 156, 158 less than the entire length thereof.

The projections 206, 208 on the spring 200 include corresponding ribs 218 that likewise extend toward the receiving space 153. The ribs 218 have a length along the projections 206, 208 that is less than the length the ribs 216 extend along the legs 156, 158. Due to this configuration, the ribs 216 on the shim 149 can be positioned within the ribs 218 on the spring 210. The spring 200 is therefore movable relative to the shim 149 in the manner D a predetermined amount until the ribs 218 abut the ends/extents of the ribs 216. In other words, the ribs 218 on the spring 216 slide over and relative to the ribs 216 on the shim 149 until the ribs 218 abut either longitudinal extent of the ribs 216.

Although the ribs 216, 218 are illustrated as having mating round cross-sections it will be appreciated that the cross-sections could likewise be square, triangular, etc. Moreover, it will be appreciated that the brake clip 102A can be configured such that the ribs 218 on the spring 200 extend into and are movable within the corresponding ribs 216 on the shim 149 (not shown).

The alignment members 220, 222 have a similar mating configuration as the ribs 216, 218. More specifically, the alignment members 220 on the shim 149 constitute ribs extending the entire length of the legs 156, 158 and towards the receiving space 153. The corresponding alignment members 222 on the spring 200 constitute ribs extending the entire length of the projections 206, 208 and towards the receiving space 153. The alignment members 220, 222 help to align the shim 149 with the spring 200 and further help to prevent relative movement therebetween in directions extending transverse to the direction D.

Moreover, since the alignment members 220 extend inward of the respective leg 206, 208, the alignment members provide a reduced contact surface/interface between the brake clip 102A and guide rail 144A. As a result, any contamination or debris that collects on the legs 206, 208 does not negatively affect the raised interface and, thus, the break-away slide force between the brake clip 102A and guide rail 144A is generally constant over the life of the brake pad 148.

Figure 4:
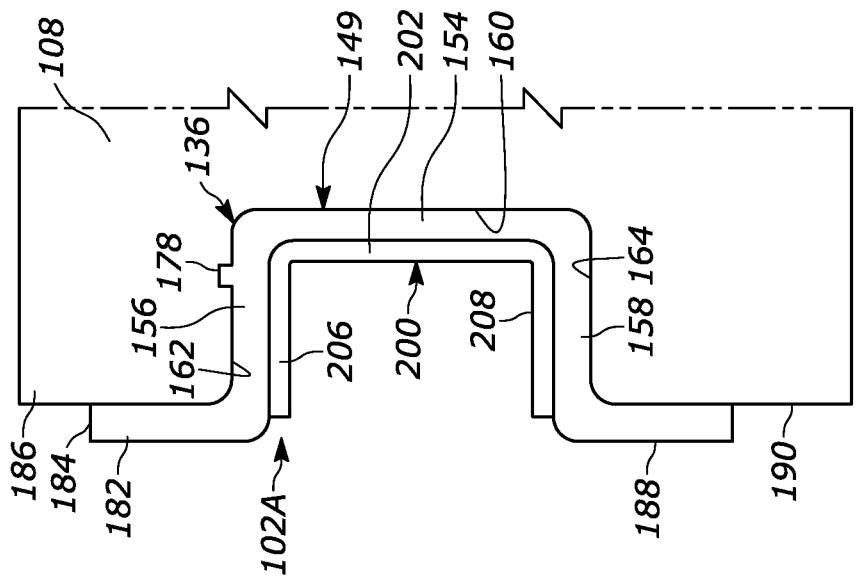
FIG. 4 is a section view of the brake clip connected to an anchor bracket of the disc brake assembly.

Referring to FIG. 4, the brake clip 102A is inserted into the first channel 136 of the anchor bracket 108. The resilient nature of the shim 149 helps to maintain the shim within the first channel 136. When the brake clip 102A is installed on the anchor bracket 108, the base leg 154 extends along a rear surface 160 of the first channel 136. The upper leg 156 extends along and is generally seated against an upper surface 162 of the first channel 136. The lower leg 158 extends along and is generally seated against or otherwise in contact with a lower surface 164 of the first channel 136. Consequently, during braking the lower leg 158 bears the load of the brake pad backing plate 146. Alternatively or additionally, the upper leg 156 and/or the base leg 154 bear this load.

The support leg 182 is configured to generally correspond with and extend adjacent to a front surface 190 of the anchor bracket 108 when the brake clip 102A is installed on the anchor bracket 108. As such, the support leg 182 is disposed between the anchor bracket 108 and the inboard backing plate 146 when the associated components of the disc brake assembly 100 are assembled. The terminal edge 184 leaves a face portion 186 of the anchor bracket 108 uncovered by the brake clip 102A. The abutment leg 188 can be curved such that an air gap is formed between the abutment leg and the front surface 190 when the brake clip 102A is installed on the anchor bracket 108.

Figure 5B:
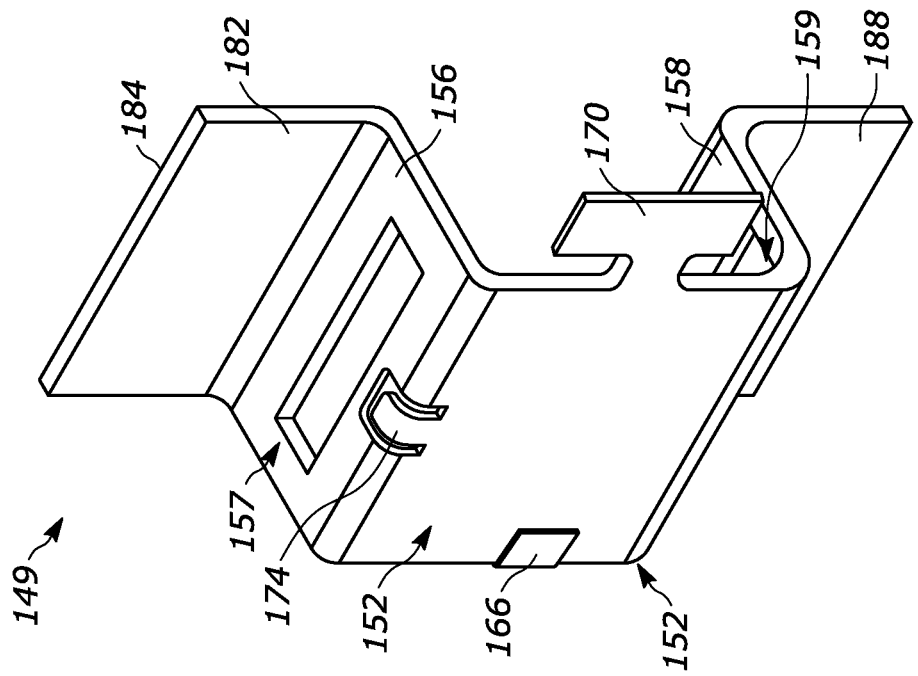
FIG. 5B is a rear view of the brake clip of FIG. 5A.
Figure 5A:
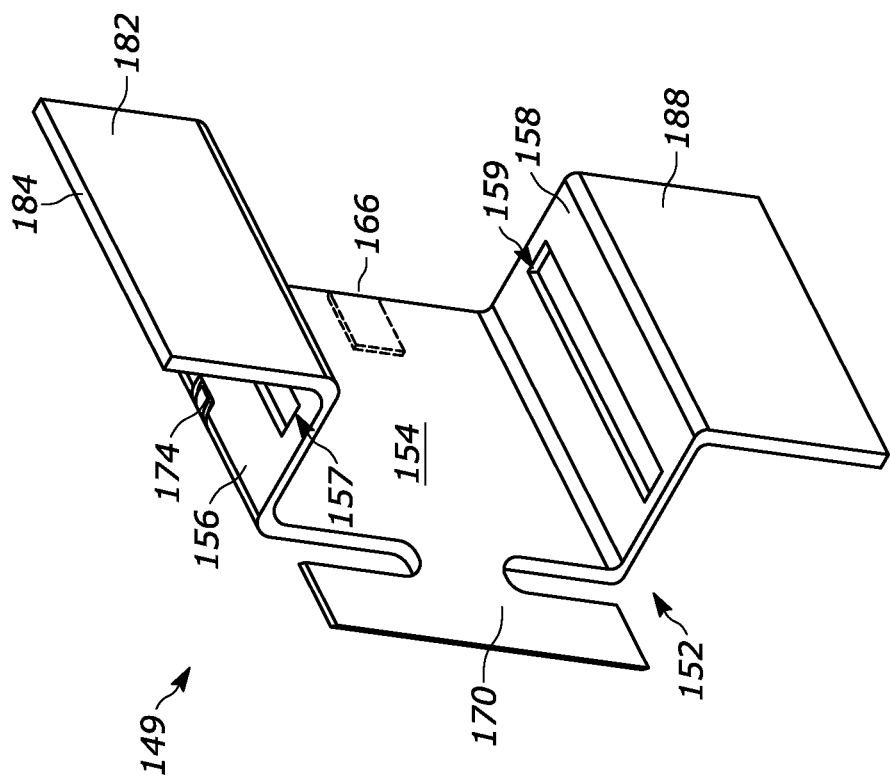
FIG. 5A is a perspective view of another example brake clip.

The shim 149 can include one or more optional, additional features for helping to secure the shim to the anchor bracket 108. To this end, and referring to FIGS. 5A-5B, a first side guide 166 can extend from the base leg 154. A second side guide 170 can also extend from the base leg 154 opposite the first side guide 166. The first and second side guides 166, 170 are resilient portions. It should be appreciated that the first and second side guides 166, 170 can be formed by a stamping operation or, alternatively, may be separate components that are secured to the base leg 154. When the brake clip 102A is installed on the anchor bracket 108, the first and second side guides 166 and 170, respectively, engage side surfaces of the anchor bracket 108 to assist in securing the brake clip 102A thereto.

Alternatively or additionally, a retention tang 174 can be provided on the upper leg 156 (as shown), the lower leg 158 or both legs (not shown). The inner face 176 faces the lower leg 158. As illustrated, the retention tang 174 extends from the base leg 154. When the brake clip 102A is installed on the anchor bracket 108, the retention tang 174 can engage a groove 178 in the upper surface 162 (see FIG. 5) to secure the brake clip 102A to the anchor bracket 108. Alternatively, the groove 178 can be omitted (not shown).

Figure 6B:
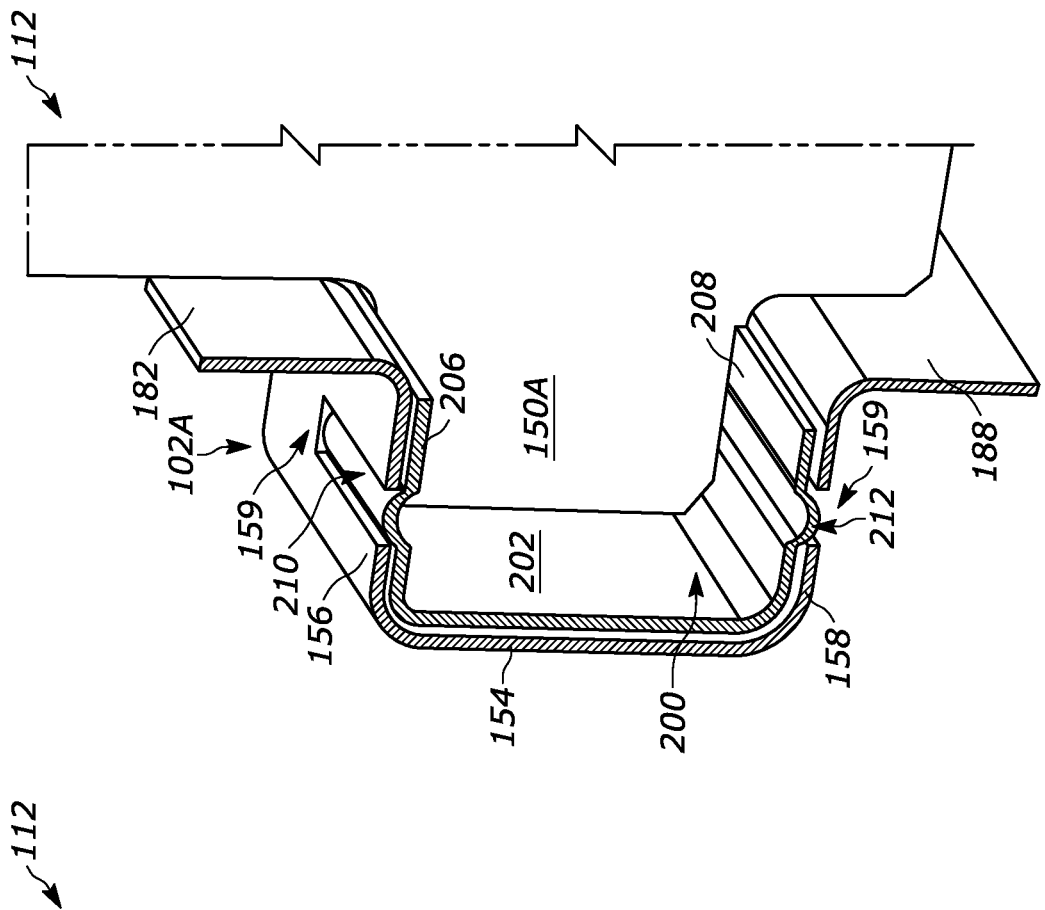
FIG. 6B is a section view taken along line 6B-6B of FIG. 6A.
Figure 6A:
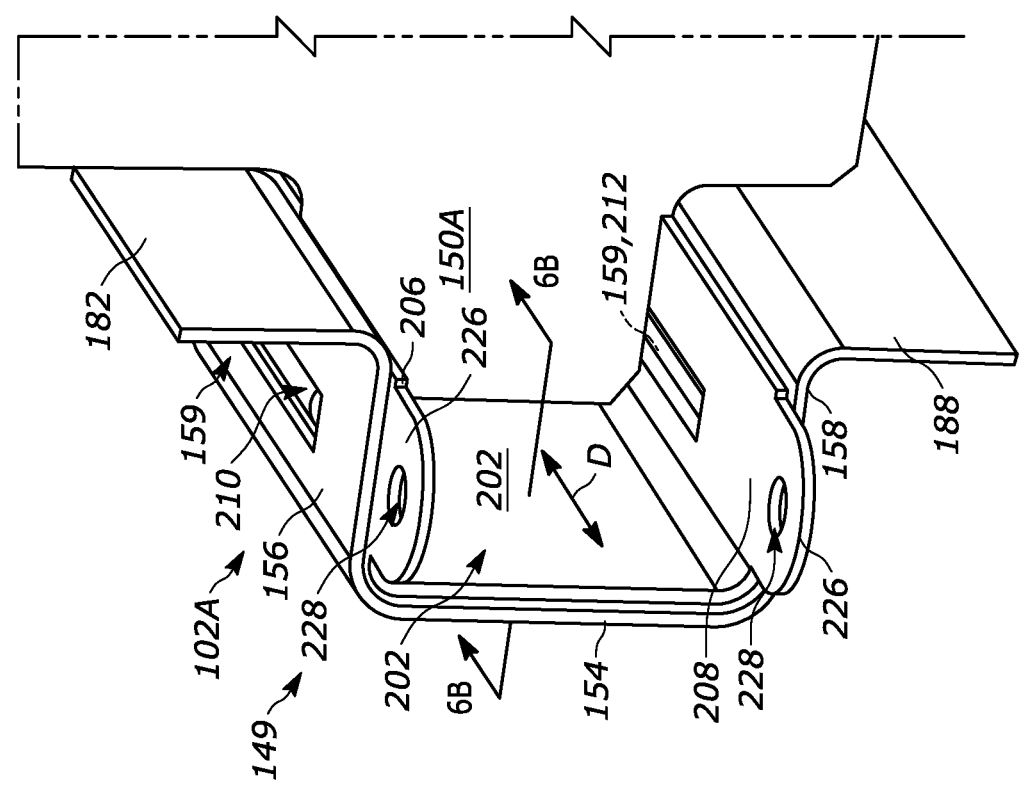
FIG. 6A is a perspective view of the brake clip connected to a brake pad.

As shown in FIGS. 6A-6B, the guide rail 150A is received in between the legs 206, 208 of the spring 200. The guide rail 150A and spring 200 are configured to have a secure connection with one another that prevents relative movement therebetween. This can be accomplished, for example, by a friction fit between the components 150A, 200 on account of a combination of material selection and the resilience of the spring 200 when positioned in the receiving space 153. It will be appreciated that each brake clip 102A can be installed on the guide rail 150A then the anchor bracket 108 or vice versa. The same is true of each of the remaining brake clips 102B, 104A, 104B.

Regardless, once the brake clip 102A is connected to both the guide rail 150A and anchor bracket 108 the brake clip allows for a prescribed degree of relative movement between the brake pad 148 secured to the guide rail 150A and the anchor bracket. More specifically, during operation of the disc brake assembly 100, the guide rail 150A (and therefore the brake pad 112 secured thereto) moves with the spring 200 in the manner D relative to the stationary shim 149, which is fixed to the anchor bracket 108. At the same time, the retaining members 157, 159, 210, 212 prevent relative movement between the shim 149 and the spring 200 in directions transverse to the direction D.

The cooperating retaining members 157, 159, 210, 212 are configured to provide a low degree of resistance to sliding of the spring 200 relative to the shim 149. Consequently, there is low resistance to movement of the brake pad 112 away from the rotor during operation of the brake disc assembly 100 throughout the life of the brake pad. The brake pad 112 needs to slide relative to the brake clip 102A in order to release the braking force from the rotor when the braking operation is complete. That said, many brake pads are susceptible to high pad slide load during this retreat. Moreover, current brake clips are susceptible to contamination via brake dust as well as wear under direct heat and sliding movement of the guide rail within the brake clip. Current brake clips may reduce wear but their current constructions can simultaneously increase rattling.

The nested brake clip of the present invention advantageously helps to alleviate these concerns. To this end, the interface between the retaining members on the brake clip is configured to help prevent contamination while providing reduced sliding friction between the shim and spring. Movement of the spring relative to the shim is guided and limited by the cooperating retaining members, which advantageously allows the brake pad to wear and slip towards the rotor without the spring interfering with rotor rotation. The same cooperating retaining members also freely allow for low resistance sliding of the brake pad away from the rotor with sufficient axial clearance to avoid interfering with the retreat. In other words, the rotor is able to create its own path/clearance during the entire braking operation.

With this in mind, since the sliding resistance between the brake clip components is low, the pinch load between the spring and the guide rail (and therefore the connection to the brake pad) can be high while helping to avoid drag. The increased pinch load on the guide rail helps to improve brake pad stability and reduce rattle.

Additionally, the length of the sliding interface between the shim and spring is greater than the thickness of the backing plate. This arrangement helps to stabilize the brake pad such that it can slide away from the rotor with little or no compliance, i.e., the brake pad slides rather that rotates. That said, the retaining members (and alignment members, when present) help to limit relative movement between the shim and spring to a single, longitudinal direction, thereby helping to prevent rotation and/or pivoting of the brake pad.

Figure 7A:
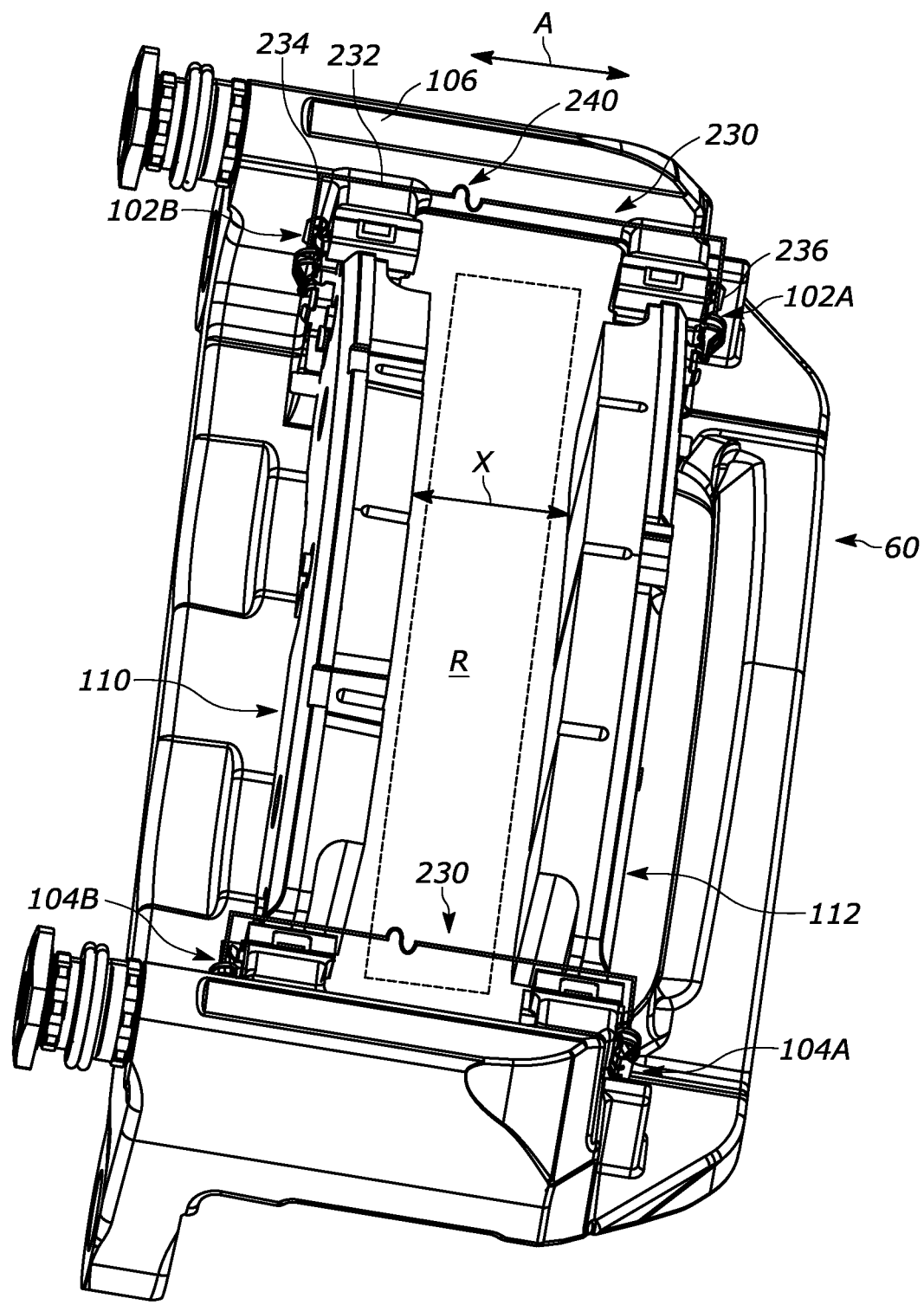
FIG. 7A is a schematic illustration of an example spreader spring connected to a pair of brake clips.
Figure 7B:
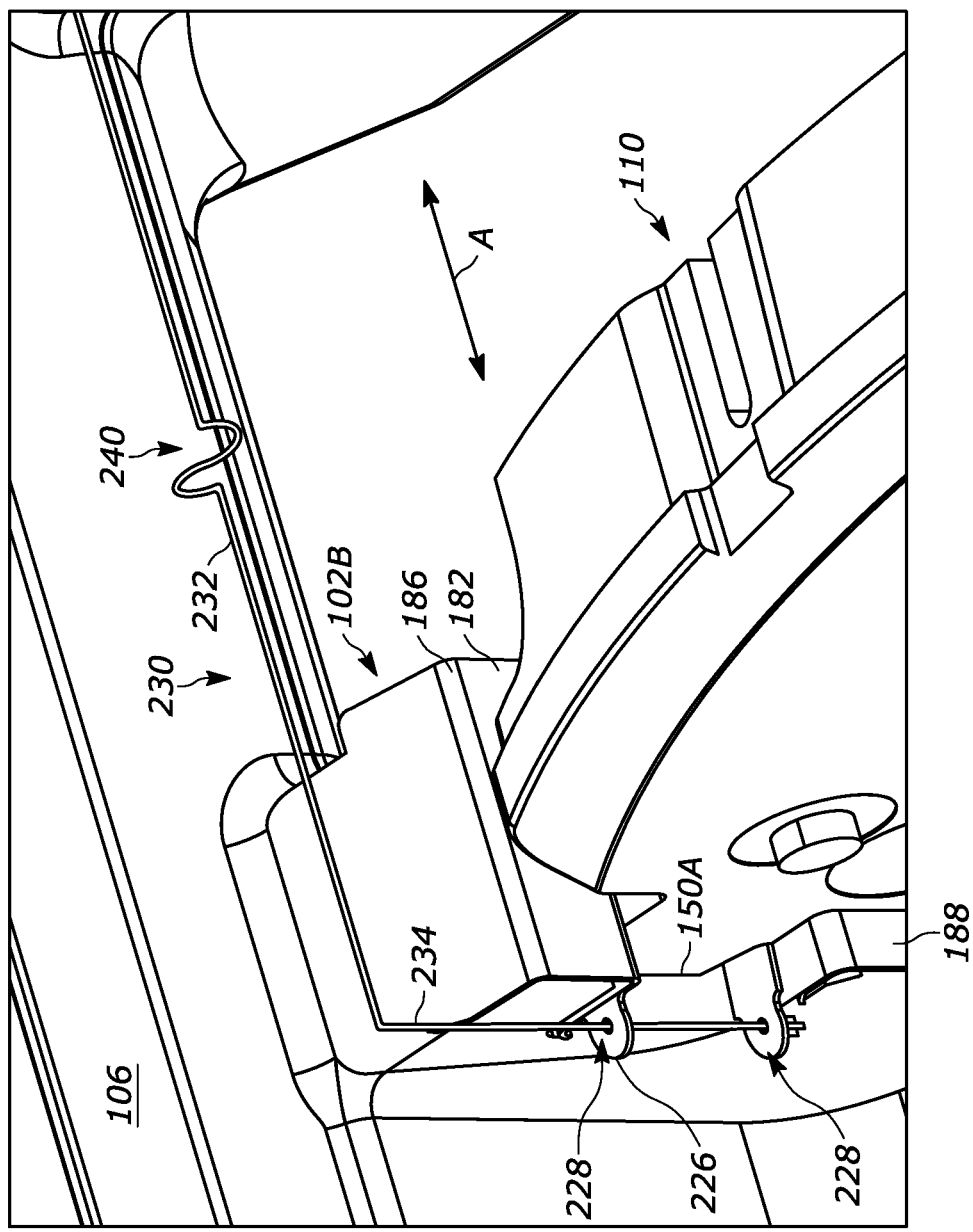
FIG. 7B is an enlarged view of a portion of FIG. 7A.

In another example shown in FIGS. 7A-7B, the brake clips 102A, 102B on the same side of the anchor bracket 108 can be connected to one another by a pad separator 230. To this end, each brake clip 102A, 102B can include one or more tabs 226 (see FIG. 6A) extending outward from the spring 200. In one example, tabs 226 can extend outward from the base 202 of the spring 200 such that the tabs on the brake clips 102A, 102B extend in opposite directions away from one another. Each tab 226 includes an opening 228.

The pad separator 230 can be configured as a resilient member that becomes rigid in response to a prescribed amount of compression. As shown, the pad separator 230 includes an elongated base 232 and a pair of legs 234, 236 extending from the base such that the pad separator has a generally U-shaped configuration. Each leg 234, 236 extends through the openings 228 on the tabs 226 and is secured, e.g., via threaded fastener, nut, etc., to the springs 200 of the brake clips 102A, 102B.

A portion 240 of the elongated base 232 can be configured to allow the legs 234, 236 to move towards one another a predetermined amount during operation of the brake disk assembly 100. In one example, the portion 240 is configured as a spring the deflects in response to movement of one leg 234 or 236 towards the other leg 234 or 236. When a predetermined amount of relative movement occurs, the spring 240 bottoms out and becomes rigid, thereby preventing further relative movement of the legs 234, 236 towards one another. In other words, the distance between the legs 234, 236 becomes substantially fixed and, thus, the distance X separating the pads 110, 112 can be readily controlled even as the pads wear during their lifetime. Consequently, a minimum clearance between the pads 110, 112 and the rotor (indicated at R in phantom) can be maintained.

Since the springs 200 are movable with the brake pads 110, 112 relative to the anchor bracket 108, connecting the springs to one another with the pad separator 230 advantageously limits the amount of separation X between the brake pads while also allowing the brake pads to float as a unit with the pad separator and relative to the rotor R in the manner indicated generally at A in FIGS. 7A-7B.

Figure 8:
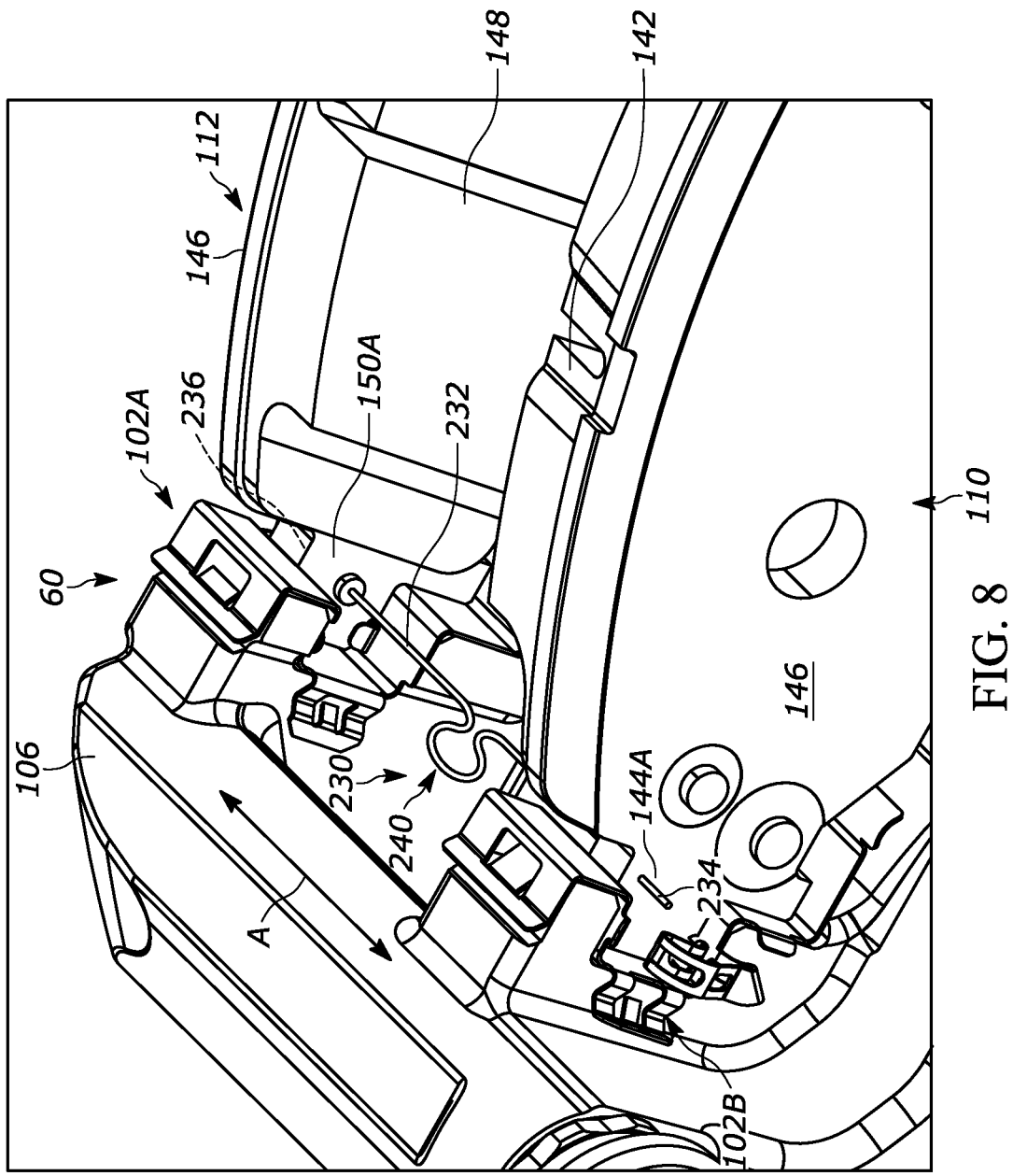
FIG. 8 is a schematic illustration of another example spreader spring connected to a pair of brake pad backing plates.

In another example shown in FIG. 8, the legs 234, 236 of the pad separator 230 are secured via fastener or the like directly to backing plates 140, 146, e.g., directly to the guide rails 144A, 150A and the guide rails 144B, 150B, respectively. It will be appreciated that the damping member 230 shown in FIG. 8 can be utilized with any of the brake clips 102A, 102B, 104A, 104B of FIG. 1 (as shown) or FIGS.

2A-5B (not shown). In each case, the damping member 230 is indirectly connected to the brake pads 110, 112 to control relative movement therebetween.

As noted, the rotor R can change position during operation in response to heat, vibration, etc. That said, the relative positioning between the brake pads 110, 112 and rotor R can change over time. Wear on the brake pads 110, 112 also affects this relative positioning over time. With this in mind, the pad separators 230 advantageously allow the brake pads 110, 112 to shift as a unit to accommodate this change in positioning. What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A brake clip for a disc brake assembly having a brake pad received in an anchor bracket, comprising:
    a shim configured to be received in the anchor bracket and having a base leg and opposing upper and lower legs extending from the base leg to define a receiving space, at least one of the upper and lower legs including a retaining member extending in a first direction over less than the entire length of the at least one of the upper and lower legs; and
    a spring provided in the receiving space for receiving the brake pad, the spring including a base and a pair of projections extending from the base and being slidably engaged with the respective upper and lower legs on the shim, at least one of the projections including a retaining member extending in the first direction over less than the entire length of the at least one projection and cooperating with the at least one retaining member on the shim to allow for a predetermined amount of relative movement between the retaining members of the shim and the spring in the first direction during operation of the disc brake assembly.

2. The brake clip recited in claim 1, wherein the retaining members prevent relative movement between the shim and the spring in a second direction extending perpendicular to the first direction.

3. The brake clip recited in claim 2, further comprising cooperating alignment members provided on the shim and the spring for preventing relative movement between the shim and spring in the second direction, the alignment members on the shim extending the entire length of the shim and the alignment members on the spring extending the entire length of the spring.

4. The brake clip recited in claim 3, wherein the alignment members comprise cooperating ribs provided on the shim and the spring.

5. The brake clip recited in claim 1, wherein each retaining member on the shim comprises an opening and each retaining member on the spring comprises a rib extending into and movable within the corresponding opening in the shim during operation of the disc brake assembly.

6. The brake clip recited in claim 1, wherein each retaining member on the spring comprises a rib and each retaining member on the shim comprises a rib received by the corresponding rib of the spring such that each rib on the spring slides over and relative to the corresponding rib on the shim during operation of the disc brake assembly.

7. The brake clip recited in claim 1, wherein each retaining member on the spring comprises an opening and each retaining member on the shim comprises a rib extending into and movable within the corresponding opening in the spring during operation of the disc brake assembly.

8. The brake clip recited in claim 1, further comprising a coating provided on the shim and the spring for reducing sliding friction therebetween.

9. A device for a disc brake assembly having first and second brake pads received in first and second anchor brackets, comprising:
    a first brake clip configured to be received in the first anchor bracket and having a base leg and opposing upper and lower legs extending from the base leg to define a receiving space therebetween for receiving the first brake pad;
    a second brake clip configured to be received in the second anchor bracket and having a base leg and opposing upper and lower legs extending from the base leg to define a receiving space therebetween for receiving the second brake pad; and
    a pad separator for connecting to the first and second brake pads for controlling relative movement therebetween, wherein the pad separator includes a base spanning the entire distance between the first and second brake clips and a pair of legs extending from opposite ends of the base, each of the legs being secured to a portion of one of the first and second brake clips such that movement of the portions of the first and second brake clips relative to one another moves the legs of the pad separator relative to one another, and wherein the base includes a spring portion that allows for a predetermined amount of relative movement between the legs and allows the length of the base to change during operation of the disc brake assembly.

10. The device recited in claim 9, wherein the pad separator is secured to the first and second brake clips for controlling relative movement between the first and second brake clips.

11. The device recited in claim 10, wherein each of the first and second brake clips includes at least opening through which the pad separator extends for securing the pad separator directly to the first and second brake clips.

12. The device recited in claim 9, wherein the spring portion prevents movement of the legs towards one another once the predetermined amount of relative movement is reached.

13. The device recited in claim 9, wherein each of the first and second brake clips comprises:
    a shim configured to be received in the respective anchor bracket and defining the legs and the receiving space, each of the upper and lower legs including a retaining member extending in a first direction; and
    a spring provided in the receiving space for receiving the brake pad, the spring including a base and a pair of projections extending from the base, each of the projections including a retaining member that cooperates with one of the retaining members on the shim to allow for a predetermined amount of relative movement between the shim and the spring in the first direction.

14. The device recited in claim 13, wherein the retaining members prevent relative movement between the shim and the spring in a second direction extending perpendicular to the first direction.

15. The device recited in claim 14, further comprising cooperating alignment members provided on the shim and the spring for preventing relative movement between the shim and spring in the second direction, the alignment members on the shim extending the entire length of the shim and the alignment members on the spring extending the entire length of the spring.

16. The device recited in claim 13, wherein the retaining members on the shim comprise openings and the retaining members on the spring comprise ribs extending into and movable within the openings in the shim during operation of the disc brake assembly.

17. The device recited in claim 9, wherein the pad separator is secured to first and second backing plates connected to the first and second brake pads.

\* \* \* \* \*